(12) United States Patent
Almgren et al.

(10) Patent No.: US 6,807,164 B1
(45) Date of Patent: Oct. 19, 2004

(54) POWER CONTROL IN A CDMA MOBILE COMMUNICATION SYSTEM

(75) Inventors: Magnus Almgren, Sollentuna (SE); Bo Engström, Luleå (SE); Mårten Ericson, Luleå (SE)

(73) Assignee: Telefonaktiebolaget LM ERicsson (publ), Stockholm (SE)

( * ) Notice: Subject to any disclaimer, the term of this patent is extended or adjusted under 35 U.S.C. 154(b) by 717 days.

(21) Appl. No.: 09/654,834

(22) Filed: Sep. 5, 2000

Related U.S. Application Data

(60) Provisional application No. 60/153,797, filed on Sep. 14, 1999.

(51) Int. Cl.[7] .............................................. H04B 7/216
(52) U.S. Cl. ...................................... 370/342; 370/522
(58) Field of Search ................................. 370/320, 317, 370/332, 333, 335, 342, 318, 424; 455/522

(56) References Cited

U.S. PATENT DOCUMENTS

| | | |
|---|---|---|
| 5,333,175 A | 7/1994 | Ariyavisitakul et al. ...... 379/58 |
| 6,404,759 B1 * | 6/2002 | Shoji .......................... 370/342 |
| 6,415,137 B1 * | 7/2002 | Hayashi ....................... 455/70 |
| 6,430,398 B1 * | 8/2002 | Blanc ......................... 455/67.3 |
| 6,473,451 B1 * | 10/2002 | Seki et al. .................. 375/142 |

FOREIGN PATENT DOCUMENTS

| | | |
|---|---|---|
| WO | 95 23460 | 8/1995 |
| WO | 98 58461 | 12/1998 |

OTHER PUBLICATIONS

PCT/SE 00/01769; Completed Jan. 2, 2001.

* cited by examiner

*Primary Examiner*—Wellington Chin
*Assistant Examiner*—Brenda Pham

(57) ABSTRACT

A method and apparatus for controlling transmission power levels in a CDMA cellular communication system are disclosed, whereby a third (middle) control loop is interposed between an inner loop and an outer loop to form a cascaded power control loop. Certain quality indicators are coupled to the outer loop and middle loop. The outer loop produces a quality target value for the middle loop. The middle loop produces the SIR target value.

34 Claims, 3 Drawing Sheets

POWER CONTROL IN A CDMA MOBILE COMMUNICATION SYSTEM

CROSS-REFERENCES TO RELATED APPLICATIONS

This Application for Patent claims the benefit of priority from, and hereby incorporates by reference the entire disclosure of, U.S. Provisional Application for Patent Ser. No. 60/153,797, filed Sep. 14, 1999.

BACKGROUND OF THE INVENTION

1. Technical Field of the Invention

The present invention relates in general to the mobile communications field and, in particular, to a method for controlling transmission power levels in a spread spectrum or Code Division Multiple Access (CDMA) cellular communication system.

2. Description of Related Art

In wideband spread spectrum cellular communication systems (often referred to as Wideband-CDMA or WCDMA systems), power control symbols are transmitted on a regular basis in order to compensate for the effects of changing conditions that influence the channel, such as fading and shadowing. For example, a base station can transmit a power control command which signals a served mobile station to increase or decrease its transmission power level. The mobile station can then decide whether to increase or decrease its transmission power level in response to the power control command received.

As such, it is an important premise that the power control algorithms used in CDMA systems be designed to maintain the negotiated quality of the data channels for all active users. Essentially, the basic power control algorithms used in existing systems are designed to implement this capability in each connection, with two nested control loops. The outer (slower) power control loop controls a transmit signal-to-interference ratio (SIR) or signal-to-noise ratio (SNR) target value, which is used in the inner (faster) closed power control loop to maintain the actual Quality of Service (QoS) as close as possible to the negotiated QoS. The inner power control loop estimates the SIR of the forward transmission channel, compares the estimated SIR to the SIR target value from the outer control loop, and based on the results of the comparison, transmits certain power control commands on the reverse transmission channel which "advise" the transmitter on the forward channel about whether to increase or decrease the transmission power level. Notably, the same power control principles are applicable for controlling both uplink and downlink transmissions.

The inner power control loops used in existing systems are designed to function based on SIR measurements that can be obtained (typically for WCDMA systems) at a rate of 1500 per second. The outer power control loops used in existing systems are designed to function based on QoS values that can be obtained at a rate of one per second. Typically, these QoS values are expressed in terms of a frame error rate (FER), bit error rate (BER), packet delay, or speech quality index (SQI). As such, these QoS values can be obtained only at the above-described rate of once per second, or once per code block (typically, 50 to 100 times per second). However, these QoS values should be accumulated over a significant period of time in order to produce statistically reliable results.

The outer power control loops used in existing systems can change a SIR target value faster for a specified amount of change (e.g., a change related to a service, such as a transmission data rate change). As such, for a properly designed power control implementation, the outer power control loop should be able to vary the SIR target value no faster than the inner power control loop can respond and change the actual SIR. This approach ensures that the actual SIR will follow the SIR target value quite closely all of the time.

Generally, during start up of a typical radio communication system (prior to establishing a link), the usual approach followed is to develop and use information about how the transmission environment and coding scheme affect the SIR requirement, in order to set the initial SIR target value. For WCDMA systems, a number of different approaches have been proposed for controlling the SIR target value after start up (once a link has been established). For example, commonly-assigned U.S. patent application Ser. No. 09/300,079 describes three such approaches, each of which assumes that it is possible to obtain the frame errors from the data channel in order to derive a SIR target adjustment value that can be added to the SIR target value. As such, these approaches primarily address the problem whereby an inner loop is unable to maintain the SIR target value calculated by the outer loop, which causes the outer loop to change the SIR target value unnecessarily.

Commonly-assigned U.S. patent application Ser. No. 09/344,121, titled "Power Control Based On Combined Quality Estimates," describes another approach for controlling the SIR target value in a WCDMA system. Although it is mentioned that the system may combine frame error measurements from the data channel with bit error measurements in order to adjust the SIR target value, no specific method for combining these measurements is disclosed.

As illustrated above, some significant power control problems need to be resolved for WCDMA systems. For example, a method for combining different types of quality indicators at different rates is needed, which can be used to control SIR target values in a WCDMA system. Also, a method for determining how to use the numerous different formats required for different services is needed. For example, some services provide a Cyclic Redundancy Check (CRC) flag for every decoded data block. This flag indicates whether or not the data block was correctly decoded. Other services provide a number indicating the reliability of the decoded data blocks. As such, a large number of service formats can be used. In any event, there is no method available for an outer loop control implementation to use quality indicators for controlling SIR target values other than using CRCs. Nevertheless, as described in detail below, the present invention successfully resolves these and other related problems.

SUMMARY OF THE INVENTION

In accordance with a preferred embodiment of the present invention, a method and apparatus for controlling transmission power levels in a WCDMA cellular communication system are provided, whereby a third (middle) control loop is interposed between an inner loop and an outer loop to form a cascaded power control loop. Certain quality indicators are coupled to the outer loop and middle loop. The outer loop produces a quality target value for the middle loop. The middle loop produces the SIR target value.

An important technical advantage of the present invention is that a WCDMA power and quality control system is provided, whereby direct (negotiated) and indirect (mapped to negotiated) quality estimate information can be used together to produce a SIR target value.

Another important technical advantage of the present invention is that a WCDMA power control system is provided, whereby a SIR target value can be produced even if quality indicators for a service are missing or can be calculated only for intermittent periods.

Still another important technical advantage of the present invention is that a WCDMA power control system is provided, whereby prior knowledge of how the transmission environment and coding scheme can affect the SIR requirements can be used to produce a SIR target value.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–6 of the drawings, like numerals being used for like and corresponding parts of the various drawings.

Essentially, in accordance with a preferred embodiment of the present invention, a method and system for controlling transmission power levels in a CDMA cellular communication system are provided, whereby a third (middle) control loop is interposed between an inner loop and an outer loop to form a cascaded power control loop system. Certain quality indicators are coupled to the outer loop and middle loop. The outer loop produces a quality target value for the middle loop. The middle loop produces the SIR target value, which is coupled to the inner loop.

Figure 1:
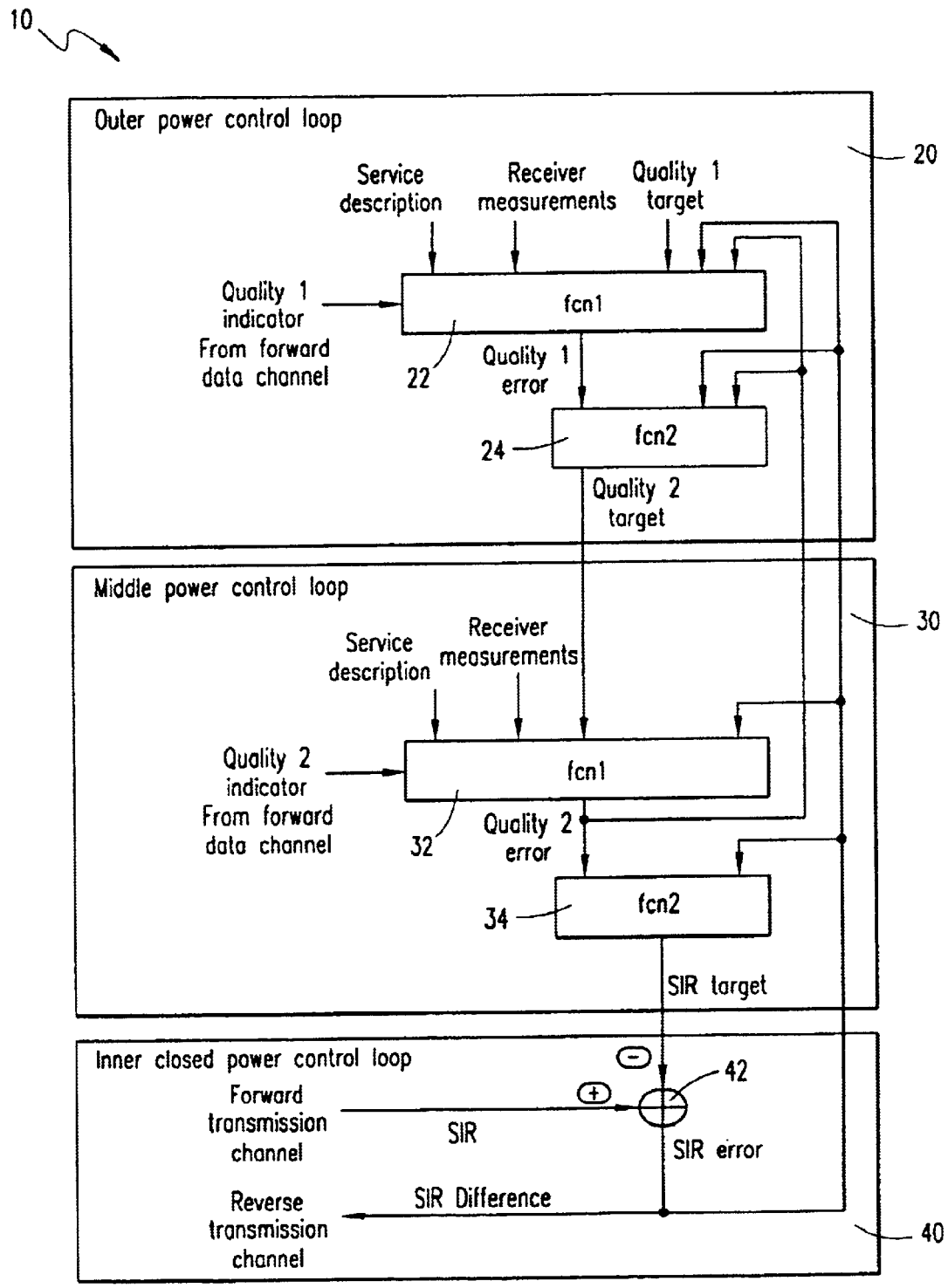
FIG. 1 is a block diagram of an exemplary power control loop system that can be used to implement a first embodiment of the present invention.

Specifically, FIG. 1 is a block diagram of an exemplary power control loop system 10 that can be used to implement a first embodiment of the present invention, for example, on the downlink. Note that the exemplary power control system 10 shown can be implemented in a base station or a mobile station. For illustrative purposes only, it can be assumed that the power control system 10 shown can be implemented as software and/or hardware in a mobile station of a spread spectrum or CDMA cellular system. As such, the exemplary system 10 shown, which is preferably to be implemented in a WCDMA system, includes an outer power control loop 20, a middle power control loop 30, and an inner (closed) power control loop 40. For this embodiment, the outer, middle and inner control loops are connected in cascade.

For this exemplary embodiment, a data quality indicator 1 (related to QoS) is coupled from the forward data channel to the function block (fcn1) 22. Examples of such data quality indicators are CRC data, block error rates, or other frame quality measurements. In a typical WCDMA system, for example, such data quality indicators can be obtained at the frame rate (e.g., one per 0.01 to 0.02 seconds). A link quality indicator 2 (also related to QoS) is coupled from the forward data channel to the function block (fcn1) 32 in the middle power control loop 30. Typically, such link quality indicators can be obtained at a higher rate (or lower estimation error) than that of the data quality indicators. Examples of such link quality indicators are raw BERs estimated by the decoder, or raw BERs estimated by comparisons between known data sequences in the data stream and the corresponding received data.

For this embodiment, the outer power control loop 20 and middle power control loop 30 are similar in structure and function. Each such loop includes a first function block (fcn1) 22, 32 and a second function block (fcn2) 24, 34. The outer control loop 20 produces a quality (2) target value for input to the middle control loop 30, and the middle control loop 30 produces the SIR target value for input to the inner control loop 40. Each first function block (fcn1) 22, 32 produces respective quality error values. Each second function block (fcn2) 24, 34 accumulates the respective quality error values coupled from the first function blocks (fcn1) 22, 32. The accumulated quality error values in the second function blocks (fcn2) 24, 34 are used to generate a quality target value for the next-lower loop in the system 10. For example, the second function block (fcn2) 24 in the outer control loop 20 generates a quality (2) target value, which is coupled to the first function block (fcn1) 32 in the middle control loop 30. The second function block (fcn2) 34 in the middle control loop 30 generates a SIR target value, which is coupled to the adder 42 in the inner control loop 40.

The estimated error values produced in each lower loop (e.g., loops 30 and 40 in this embodiment) in the cascaded system 10 are coupled to the function blocks (e.g., fcn1, fcn2) 22, 24, 32, 34 in the "upper" control loops (e.g., 20, 30). These estimated error values can be used to "fine tune" the power control algorithms in the receiving function blocks. Also, certain receiver measurement information can be input to the function blocks and used to "fine tune" their respective power control algorithms. For example, receiver measurement information such as delay spread can be provided from the channel estimator to the first function blocks (fcn1) 22, 32. Other receiver measurement information, such as, for example, the number of fingers used by the RAKE receiver can also be input to the first function blocks and used for "fine tuning" of their respective power control algorithms. Furthermore, the power control algorithms in the first function blocks (fcn1) 22, 32 also utilize the service information related to the link that the power control loop is handling. For example, the particular service involved can be identified with a specific source, format and rate of the quality indicator being received. For this exemplary embodiment, regardless of the type of quality indicator being received by the first function blocks (fcn1), the set of possible quality indicator values are extended to include an indication of any "missing" quality indicator value, which enables the outer control loop 20 or middle control loop 30 to adequately function given such a situation.

Figure 2:
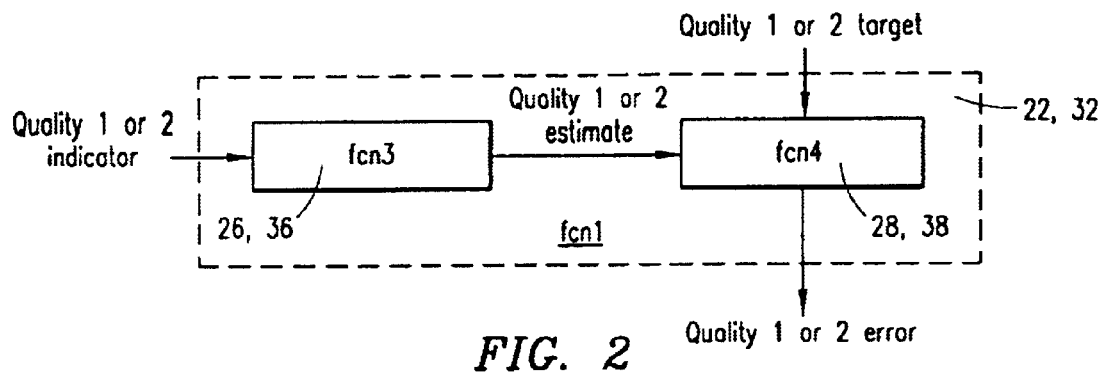
FIG. 2 is a block diagram of the first function block (fcn1) shown in FIG. 1, which can be used to estimate the quality error for outer and middle power control loops, in accordance with the first embodiment of the present invention.

FIG. 2 is a block diagram of the first function block (fcn1) 22 or 32 shown in FIG. 1, which can be used to estimate the quality error for the outer and middle power control loops 22, 32, in accordance with the first embodiment of the present invention. The first function block (fcn1) 22 or 32 includes a quality estimation function block (fcn3) 26 or 36, and a mapping function block (fcn4) 28 or 38. The pertinent details of an exemplary quality estimation function block (fcn3) 26 or 36 that can be used to implement the first embodiment, are shown in the block diagram of FIG. 3. The pertinent details of an exemplary mapping function block (fcn4) 28 or 38 that can be used to implement the first embodiment, are shown in the block diagram of FIG. 4.

Figure 3:
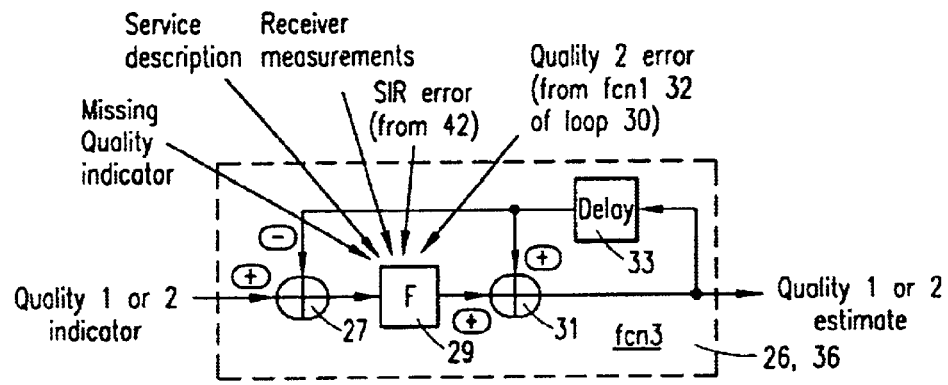
FIG. 3 is a block diagram of an exemplary quality estimation function block (fcn3) that can be used to implement the first embodiment of the present invention.

Referring to the quality estimation function block (fcn3) 26 (or 36) shown in FIG. 3, for this embodiment, the quality (1 or 2) estimation function can be performed by an exponential filter (F) 29 having a non-linear gain. The quality (1 or 2) indicator information is coupled to an adder 27 and added (as negative feedback) to the negative value of the delayed (33) quality (1 or 2) estimate signal from the output of the function block 26 or 36. The output of the adjustable gain (F) 29 is coupled to an adder 31 and added to the positive value of the delayed (33) quality 1 or 2 estimate signal. With the configuration shown in FIG. 3, the quality estimator function block (fcn3) 26 or 36 can calculate and output the mean of the quality indicator (1 or 2) input signal.

Also, as shown in FIG. 3, the adjustable gain (F) 29 can be controlled by one or more receiver measurement values or service-type information provided from the network or system involved, along with signals from other functions in the cascaded arrangement of power control loops. For example, referring to FIGS. 1 and 3, it can be seen that the quality 2 error signal is coupled from the quality error estimation function block (fcn1) 32 of the middle control loop 30 to the adjustable gain (F) 29. Also, the SIR error signal from the inner power control loop 40 is coupled to the adjustable gain (F) 29.

Other information that can be used to set the adjustable gain (F) 29 is missing quality indicator information, as shown in FIG. 3. As such, the missing quality indicator can provide information about malfunctions or problems related to functions elsewhere in the cascaded set of control loops. For example, the missing quality indicator can indicate whether the SIR error value from the inner control loop 40, or the quality 2 error value from the middle control loop 30, has been significantly diverted away from a zero error value. If so, the missing quality indicator information can be used to control the adjustable gain (F) 29, in order to drive the error signal back to a zero value. For such situations, it is preferable that the quality estimator (fcn3) not change the quality estimate from the value that was calculated when a valid quality indicator was last available, or when relatively small error values were last reported. This objective can be achieved by having the estimator (fcn3) 26 or 36 monitor an average of the input (e.g., SIR or quality) error values, and selecting an adjustable gain (F) 29 value that is multiplied by zero when relatively large errors occur or a quality indicator value is not available for input.

Figure 4:
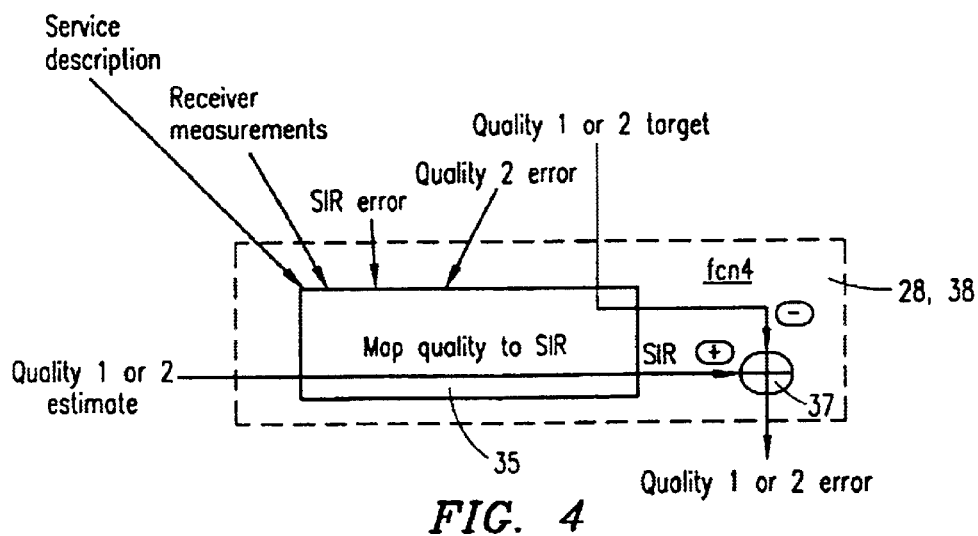
FIG. 4 is a block diagram of an exemplary mapping function block (fcn4) that can be used to implement the first embodiment of the present invention.

As mentioned above, FIG. 4 is a block diagram of an exemplary mapping function block (fcn4) 28 or 38 that can be used to implement the first embodiment. Any appropriate mapping algorithm (e.g., software-based or hardware-based) can be used to implement the mapping function algorithm 35, in order to map a quality 1 or 2 estimate value from the quality estimation function block (fcn3) 26 or 36 (FIG. 3) to a quality 1 or 2 error value. As shown in FIG. 4, the mapping function algorithm 35 maps the input quality 1 or 2 estimate value to a corresponding SIR value. At the adder 37, a quality 1 or 2 target value is subtracted from the SIR value output from the mapping function algorithm 35 to produce a corresponding quality 1 or 2 error value.

Notably, in accordance with the teachings of the present invention, FIG. 4 illustrates that prior knowledge about how the transmission environment and coding scheme affect the SIR requirement can be used in mapping the quality 1 or 2 estimate values and quality 1 or 2 target values to corresponding SIR values. The transmission environment information to be used can be determined by receiver measurements and certain calculations performed on the SIR error and quality 2 error values. These calculations can include, for example, calculating the mean, standard deviation, and mean absolute derivative of the SIR error and/or quality 2 error values over some predetermined period of time. As such, when the quality 1 or 2 target values are to be calculated (and mapped through the function block 35), the mapped (calculated) quality error values can then be expressed in the same units as the SIR values. The mapped target and SIR values from the mapping function block 35 are then added (37) to produce the corresponding quality 1 or 2 error values.

Figure 5:
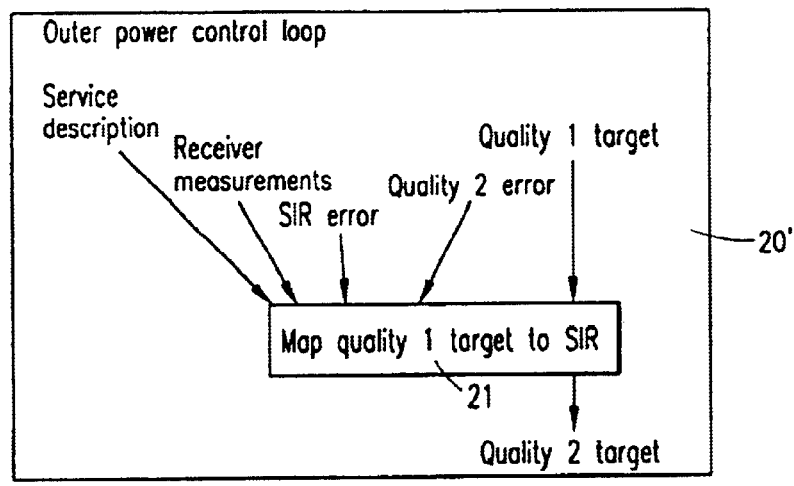
FIG. 5 is an exemplary block diagram that illustrates how an outer loop power control function can be implemented when no quality 1 indicator information is available for a service, in accordance with a second embodiment of the present invention.

FIG. 5 is an exemplary block diagram that illustrates how an outer loop power control function can be implemented when no quality 1 indicator information is available for a service, in accordance with a second embodiment of the present invention. For example, for the outer power control loop 20' shown in FIG. 5, it can be seen that no quality 1 or 2 estimate information is being input to the mapping function block 21. In other words, no quality 1 indicator information is being input to the estimation function block (fcn3) 26 in FIG. 2, so there is no corresponding quality estimate information available. However, for the second embodiment, as shown in FIG. 5, for services where no quality 1 indicator information is available, the quality 1 target information can be mapped (through mapping function block 21) directly to a quality 2 target value, which is expressed in SIR units. Again, using the approach described above with respect to the mapping function block 35 in FIG. 4, prior knowledge about how the transmission environment and coding scheme affect the SIR requirement can be used in mapping the quality 1 target values to quality 2 target values expressed as SIR units.

Figure 6:
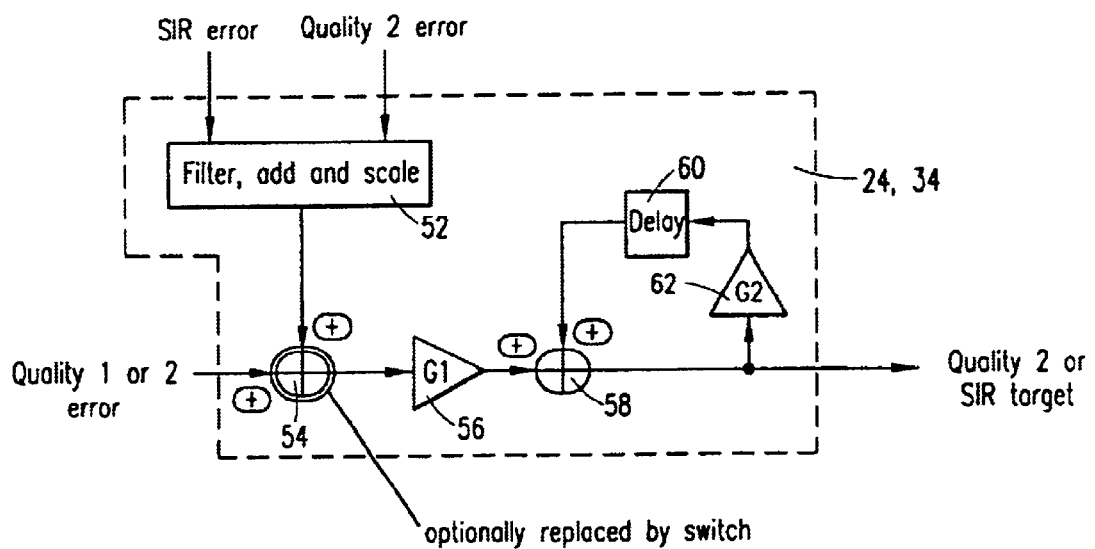
FIG. 6 is a block diagram of an exemplary quality (or SIR) target value calculation function block (fcn2), which can be used to implement the present invention.

FIG. 6 is a block diagram of an exemplary quality (or SIR) target value calculation function block (fcn2) 24 or 34 (FIG. 1), which can be used to implement the first or second embodiments of the present invention. Quality 1 or 2 error information is input to an adder 54 in the quality target value calculation function block (fcn2) 24 or 34. This input error information is an estimate of the amount of change required for the actually achieved quality values from the data channels to reach the quality target (negotiated) values. If the function blocks in the other, lower level control loops are operating within appropriate limits (e.g., relatively small SIR error values and if applicable, relatively small quality 2 error values), then the quality 1 or 2 error input values can be coupled to a filter loop arrangement including a first gain component (G1) 56, a second gain component (G2) 62, a delay component 60, and an adder 58. As shown in FIG. 1, the output signal from the filter arrangement forms the quality 2 target value or SIR target value for the next control loop in the cascaded set of power control loops. However, if the function blocks in the other, lower level control loops are not operating within appropriate limits (e.g., relatively large SIR error values and if applicable, relatively large quality 2 error values), in order to prevent the quality 2 target values or SIR target values from building up to unreasonably large values, an appropriate value from the filter, add and scale function block 52 can be added (54) to the input quality 1 or 2 error values in order to set the input to the filter arrangement (G1, G2, delay, etc.) to zero. Alternatively, the filter, add and scale function block 52 can be used to filter and scale SIR error values (and if applicable, quality 2 error values) appropriately, in order to set a bias to the input of the filter arrangement which can appropriately limit the quality 2 target values or SIR target values output from the quality target value calculation block (fcn2) 24 or 34.

Returning to FIG. 1, in accordance with the first embodiment of the present invention, a portion of an inner closed power control loop 40 is shown (e.g., on the downlink) which includes an adder 42. For this embodiment, the actually achieved SIR received from the forward transmission (downlink) channel is algebraically added (42) to the (negative of the) SIR target value from the function block (fcn2) 34 in the middle control loop 30 to produce a SIR difference (error) value. A mobile station (not shown) can transmit the SIR difference (error) value to a serving base station (not shown) on the reverse (uplink) transmission channel.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A power control loop system for a mobile communication system, comprising:
    a first control loop, said first control loop including a first quality error value estimator coupled to a first quality target value calculator;
    a second control loop, an input of said second control loop coupled to an output of said first control loop, said second control loop including a second quality error value estimator coupled to a second target value calculator; and
    a third control loop, an input of said third control loop coupled to an output of said second control loop, said third control loop including a SIR error value generator.

2. The power control loop of claim 1, wherein said first control loop includes means for mapping a quality target value to a SIR domain if quality error value information is not available.

3. The power control loop system of claim 1, wherein said mobile communication system comprises a CDMA mobile communication system.

4. The power control loop system of claim 1, wherein said mobile communication system comprises at least one of a spread spectrum system and WCDMA system.

5. The power control loop system of claim 1, wherein said first control loop, said second control loop and said third control loop are coupled together in a cascaded arrangement.

6. The power control loop system of claim 1, wherein said first control loop further comprises:
    means for estimating a quality value from a quality indicator value; and
    means for converting said estimated quality value to a quality error value.

7. The power control loop system of claim 6, wherein said means for estimating a quality value comprises an exponential filter with adjustable gain.

8. The power control loop system of claim 1, wherein said first control loop further comprises means for generating a quality target value corresponding to a quality error value.

9. The power control loop system of claim 6, further comprising:
    means for mapping said estimated quality value to a SIR domain; and
    means for converting said estimated quality value to said quality error value.

10. The power control loop system of claim 8, wherein said means for generating a quality target value further comprises means for Infinite Impulse Response (IIR) filtering of said quality error value.

11. The power control loop system of claim 1, wherein said second control loop further comprises:
    means for estimating a quality value from a quality indicator value; and
    means for converting said estimated quality value to a quality error value.

12. The power control loop system of claim 11, wherein said means for estimating a quality value comprises an exponential filter with adjustable gain.

13. The power control loop system of claim 11, further comprising:
    means for mapping said estimated quality value to a SIR domain; and
    means for converting said estimated quality value to said quality error value.

14. The power control loop system of claim 1, wherein said second control loop further comprises means for generating a SIR target value corresponding to said quality error value.

15. The power control loop system of claim 14, wherein said means for generating a SIR target value further comprises means for IIR filtering of said quality error value.

16. The power control loop system of claim 1, wherein said third control loop further comprises means for generating a SIR error value corresponding to a SIR target value.

17. The power control loop system of claim 1, wherein said first control loop and said second control loop comprise a plurality of power control algorithms implemented in software.

18. A method for controlling transmitter power in a mobile communication system, comprising the steps of:
    a first control loop estimating a first quality error value and calculating a first quality target value;
    a second control loop estimating a second quality error value and calculating a second quality target value; and
    a third control loop generating a SIR error value corresponding to said second quality target value.

19. The method of claim 18, further comprising the step of mapping a quality target value to a SIR domain if quality error value information is not available.

20. The method of claim 18, wherein said mobile communication system comprises a CDMA mobile communication system.

21. The method of claim 18, wherein said mobile communication system comprises at least one of a spread spectrum system and WCDMA system.

22. The method of claim 18, further comprising the step of cascading said first control loop, said second control loop and said third control loop together.

23. The method of claim 18, further comprising the steps of:
    said first control loop estimating a quality value from a quality indicator value, and converting said estimated quality value to a quality error value.

24. The method of claim 23, wherein the step of said first control loop estimating a quality value further comprises estimating said quality value with an exponential filter having adjustable gain.

25. The method of Claim 18, further comprising the steps of:
   said first control loop generating a quality target value corresponding to a quality error value.

26. The method of claim 23, further comprising the steps of:
   mapping said estimated quality value to a SIR domain, and converting said estimated quality value to said quality error value.

27. The method of claim 25, wherein the step of said first control loop generating a quality target value further comprises generating said quality target value by Infinite Impulse Response (IIR) filtering of said quality error value.

28. The method of claim 18, further comprising the steps of:
   said second control loop estimating a quality value from a quality indicator value, and converting said estimated quality value to a quality error value.

29. The method of claim 28, wherein the step of said second control loop estimating a quality value further comprises estimating said quality value with an exponential filter having adjustable gain.

30. The method of claim 28, further comprising the steps of:
   mapping said estimated quality value to a SIR domain, and
   converting said estimated quality value to said quality error value.

31. The method of claim 18, further comprising the steps of:
   said second control loop generating a SIR target value corresponding to a quality error value.

32. The method of claim 31, wherein the step of said second control loop generating a SIR target value further comprises IIR filtering of said quality error value.

33. The method of claim 18, further comprising the steps of:
   said third control loop generating a SIR error value corresponding to a SIR target value.

34. The method of claim 18, wherein said first control loop and said second control loop comprise a plurality of power control algorithms implemented in software.

\* \* \* \* \*